United States Patent
Turng et al.

(10) Patent No.: US 7,509,993 B1
(45) Date of Patent: Mar. 31, 2009

(54) SEMI-SOLID FORMING OF METAL-MATRIX NANOCOMPOSITES

(75) Inventors: Lih-Sheng Turng, Madison, WI (US);
Michael P. DeCicco, Madison, WI (US);
Xiaochun Li, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 11/202,851

(22) Filed: Aug. 13, 2005

(51) Int. Cl.
*B22D 19/14* (2006.01)
*B22D 17/00* (2006.01)
*B22D 27/04* (2006.01)
*B22D 27/08* (2006.01)

(52) U.S. Cl. ............... 164/97; 164/71.1; 164/113; 164/900

(58) Field of Classification Search ............. 164/97, 164/71.1, 113, 900
See application file for complete search history.

(56) References Cited

U.S. PATENT DOCUMENTS

| | | | |
|---|---|---|---|
| 2,861,302 A | 11/1958 | Mann et al. | |
| 2,877,525 A | 3/1959 | Schaeber | |
| 3,467,166 A | 9/1969 | Getselet et al. | |
| 3,678,988 A * | 7/1972 | Tien et al. ............. | 164/501 |
| 3,693,697 A | 9/1972 | Tzavaras | |
| 3,902,544 A | 9/1975 | Flemings et al. | |
| 3,948,650 A | 4/1976 | Flemings et al. | |
| 4,229,210 A | 10/1980 | Winter et al. | |
| 4,321,958 A | 3/1982 | Delassus | |
| 4,434,837 A | 3/1984 | Winter et al. | |
| 4,645,534 A | 2/1987 | D'Angelo et al. | |
| 4,678,024 A | 7/1987 | Hull et al. | |
| 4,694,881 A | 9/1987 | Busk | |
| 4,694,882 A | 9/1987 | Busk | |
| 4,770,699 A | 9/1988 | Mountford | |
| 4,776,767 A | 10/1988 | Motomura | |
| 4,847,047 A | 7/1989 | Groetsch, Jr. et al. | |
| 4,986,340 A | 1/1991 | Eriksson | |
| 5,228,494 A | 7/1993 | Rohatgi | |
| 5,305,817 A * | 4/1994 | Borisov et al. .......... | 164/97 |
| 5,322,111 A | 6/1994 | Hansma | |
| 5,501,266 A | 3/1996 | Wang et al. | |

(Continued)

FOREIGN PATENT DOCUMENTS

EP 867246A A1 9/1998

(Continued)

OTHER PUBLICATIONS

Vidrich, G., Moll, O. and Ferkel, H., "Grain refinement of Mg alloys by nanoscaled TiN particles," JOM, v 56, n 11, p. 84 (Nov. 2004), Minerals, Metals and Materials Society.

*Primary Examiner*—Kevin P Kerns
(74) *Attorney, Agent, or Firm*—Craig A. Fieschko, Esq.; DeWitt Ross & Stevens S.C.

(57) ABSTRACT

A metal matrix nanocomposite is formed by heating a metal above its liquidus temperature, adding nanoparticles, and then agitating the mixture with high-frequency (and preferably ultrasonic) vibration. The mixture can then be cooled below the liquidus of the metal to a semisolid state, and placed in a mold to form it into some desired shape. The formed mixture can then be quenched or otherwise allowed to cool to provide an article in finished (or nearly so) form.

25 Claims, 1 Drawing Sheet

U.S. PATENT DOCUMENTS

| | | | |
|---|---|---|---|
| 5,579,825 A | 12/1996 | Shibata et al. | |
| 5,685,357 A | 11/1997 | Kato et al. | |
| 5,711,366 A | 1/1998 | Mihelich et al. | |
| 5,735,333 A | 4/1998 | Nagawa | |
| 5,836,372 A | 11/1998 | Kono | |
| 5,865,238 A * | 2/1999 | Carden et al. | 164/97 |
| 6,135,196 A | 10/2000 | Kono | |
| 6,165,411 A | 12/2000 | Adachi et al. | |
| 6,253,831 B1 * | 7/2001 | Genma et al. | 164/499 |
| 6,308,768 B1 | 10/2001 | Rice et al. | |
| 6,645,323 B2 | 11/2003 | Flemings et al. | |
| 6,745,818 B1 | 6/2004 | Fan et al. | |
| 6,808,004 B2 * | 10/2004 | Kamm et al. | 164/113 |
| 6,851,466 B2 | 2/2005 | Adachi et al. | |
| 6,892,790 B2 * | 5/2005 | Czerwinski et al. | 164/113 |
| 6,939,388 B2 * | 9/2005 | Angeliu | 75/332 |
| 2004/0016318 A1 | 1/2004 | Angeliu | |
| 2004/0089437 A1 | 5/2004 | Fan et al. | |
| 2005/0000319 A1 | 1/2005 | Huang et al. | |
| 2005/0279479 A1 * | 12/2005 | Han et al. | 164/71.1 |

FOREIGN PATENT DOCUMENTS

| | | |
|---|---|---|
| GB | 2276831 A | 10/1994 |
| JP | 01192447 A | 8/1989 |
| WO | WO 9009251 A1 | 8/1990 |
| WO | WO 9534393 A1 | 12/1995 |
| WO | WO 9721509 A1 | 6/1997 |
| WO | WO 01/91945 | 12/2001 |

* cited by examiner

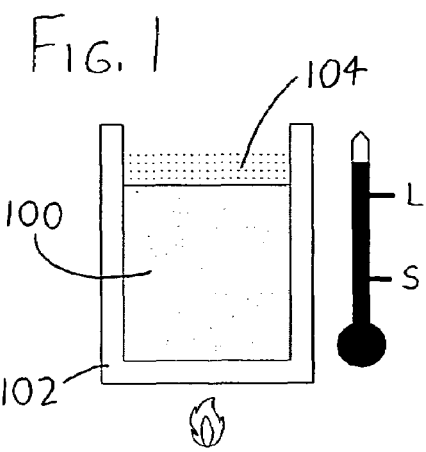
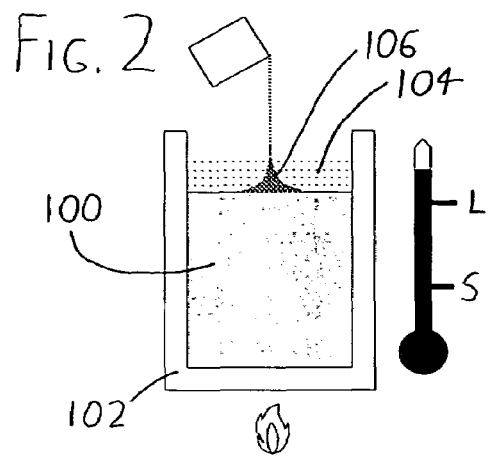
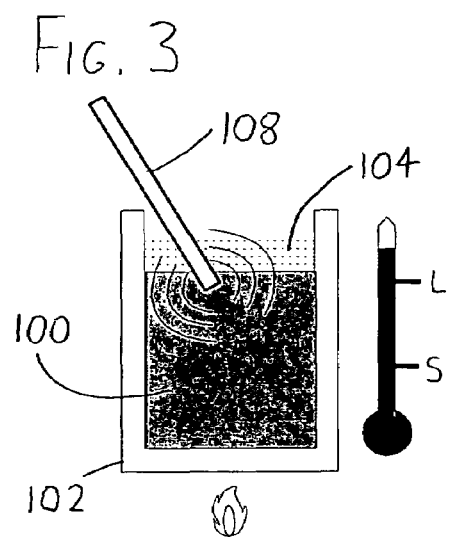
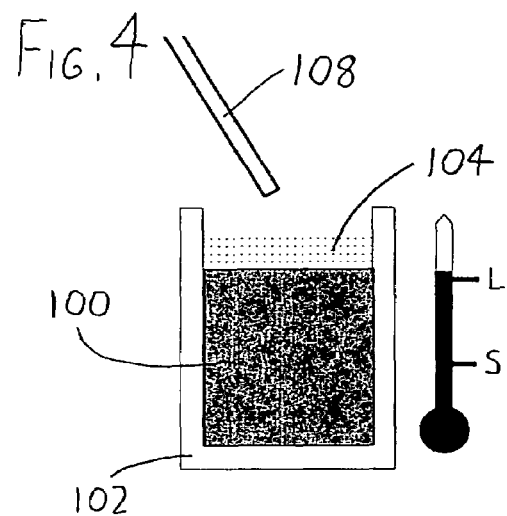
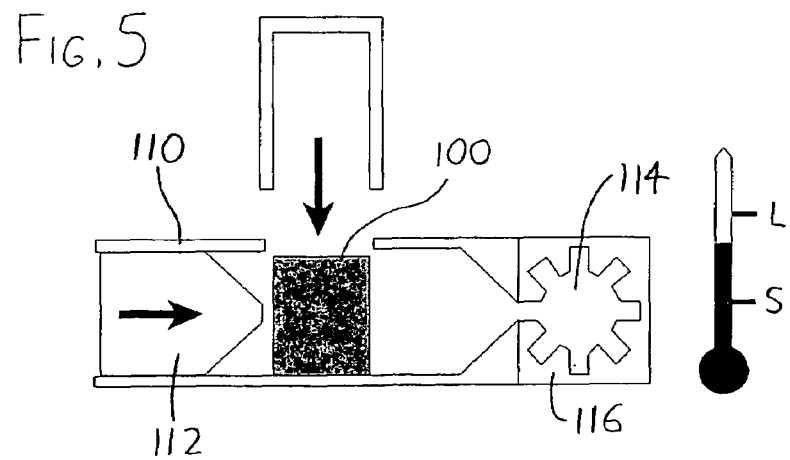

SEMI-SOLID FORMING OF METAL-MATRIX NANOCOMPOSITES

STATEMENT REGARDING FEDERALLY SPONSORED RESEARCH

This invention was made with United States government support awarded by the following agencies:
National Science Foundation (NSF) Grant No. 0323509
The United States government has certain rights in this invention.

FIELD OF THE INVENTION

This document concerns an invention relating generally to metal forming processes, and more specifically to methods for performing semisolid casting.

BACKGROUND OF THE INVENTION

High-pressure die casting (HPDC) is a process where metal (this term being used to refer to both metals and alloys) above its liquidus temperature, i.e., fully liquid metal, is injected into a cavity in a mold at high speed and pressure. HPDC is one of the most economical processes for mass production of cast metal items because of the short time needed for the casting cycle, the ability to make multiple items in a single casting, and the fact that the items leaving the mold may be in final form (or nearly so, requiring minimal finishing). However, the speed of HPDC also generates disadvantages. In particular, the turbulence in the flowing metal can give rise to defects in the cast item such as porosity (voids), oxide inclusions (embedded "rusty spots" which affect metal properties), and cold shot (sections which solidify without bonding to adjacent sections), which are not acceptable for applications that require high strength or leak tightness. Additionally, it is difficult to use HPDC to form metal-matrix composites—composites wherein particles are scattered throughout metal (such as the use of hard silicon carbide particles within metal)—since the particles may segregate from the metal matrix owing to the density variations in the metal up to and during the time it is injected into the mold cavity.

Squeeze casting is an improvement of HPDC where the mold is maintained at higher temperature, and the molten metal is injected upwardly against gravity at a slower speed into the mold cavity. The metal flow is laminar, and fills the cavity progressively, thereby allowing higher-quality items to be cast. However, owing to the longer cycle time and substantially shorter die life of squeeze casting, it can rarely be economically used. Also, as with HPDC, it can be difficult or impossible to cast metal-matrix composites owing to particle segregation.

Semi-solid casting is a processing concept where metal is injected into a mold cavity at a temperature between its liquidus and solidus temperatures—in other words, in a semi-liquid/solid state having a "slushy" or butter-like consistency—with the metal having a globular, non-dendritic microstructure (i.e., its microstructure is formed of adjacent crystalline globes or clumps, as opposed to the interbranched snowflake-like crystals found in dendritic microstructures). Semi-solid casting holds great promise since the semi-solid metal has lower energy demands, is more easily handled, and has less porosity because it does not readily flow turbulently. Additionally, the formed semi-solid metal has a near-net shape, requiring minimal post-molding machining, because it experiences less shrinkage than a liquid metal as it cools. However, the drawback of semi-solid casting is the difficulty in generating the globular microstructure, which is needed to provide most of the foregoing advantages (in particular, the ability to non-turbulently flow while in a semi-solid state).

Thixocasting is a semi-solid casting process where metal billets with globular microstructure are formed (usually using electromagnetic stirring), with these billets later being partially re-melted into a semi-solid state before being injected into a mold cavity. Unfortunately, since the cost of the special billets and the re-melting process is high, thixocasting can cost more than squeeze casting, and this issue has limited the acceptance of thixocasting. Thixomolding is a similar process wherein solid alloy pellets are melted, sheared (generally by one or more rotating screws), and transported forward into a shot chamber, from which the alloy (in a semi-solid state) is injected into a steel mold. While thixomolding can be more cost-effective than thixocasting, it has limitations insofar as the metal injection force tends to be lower than that in HPDC (and thus item quality may be lower than in HPDC), and additionally thixomolding cannot be cost-effectively performed with corrosive metals such as aluminum owing to wear on the thixomolding apparatus.

Rheocasting is another type of semi-solid casting process wherein liquid metal is mixed as it cools into a range between its liquidus and solidus (i.e., until it is cooled into a semi-solid state) to produce semi-solid metal with a globular microstructure. The semi-solid metal is then charged directly into a HPDC press to make items. Conceptually, rheocasting could be a cost-competitive process, but it is often difficult to control the process parameters in such a way that the required globular microstructure is produced: the liquid metal must be cooled relatively rapidly without generating large temperature gradients in the metal. Thus, as of 2005, rheocasting has not yet been perfected to such a degree that it has attained widespread use.

It would therefore be useful to have available processes which allow economical and semi-solid casting to be performed with greater flexibility in process parameters, and with the resulting cast items having quality similar to (or better than) those produced using HPDC, with reduced porosity, reduced shrinkage, and refined grain structure. It would further be useful if such processes could accommodate the processing of metal-matrix composites of uniform quality, i.e., wherein particulates are evenly distributed throughout the metal.

SUMMARY OF THE INVENTION

The invention, which is defined by the claims set forth at the end of this document, is directed to methods which at least partially alleviate the aforementioned problems. A basic understanding of some of the preferred features of the invention can be attained from a review of the following brief summary of the invention, with more details being provided elsewhere in this document.

A metal matrix nanocomposite, that is, a composite wherein small particles (having at least one dimension on the order of 100 nm or less) are dispersed throughout a metal matrix, can be formed by heating a metal above its liquidus temperature, thereby placing the metal in its liquid state. Nanoparticles may then be added to the liquid metal, preferably in amounts of 0.25%-5.0% of the weight of the overall mixture, and most preferably in amounts of 0.25%-2.0% of the weight of the mixture. The metal/nanoparticle mixture can then be agitated by subjecting the mixture to high-frequency (preferably >5 khz) vibration. Most preferably, ultrasonic vibration (>20 khz) is used, and is applied by at least partially inserting a vibrating probe/member into the mixture (or possibly multiple probes, e.g., where the volume of the mixture is large). Such vibration has been found effective to at least substantially uniformly disperse the nanoparticles throughout the mixture, usefully reducing or eliminating problems with clumping of the nanoparticles.

The mixture can then be cooled, and the vibrating member can be removed from the mixture. Preferably, at the latest, the vibrating member is removed when the metal is at or near its liquidus temperature (e.g., within about 50 C of the liquidus). Removal of the vibrating member can also occur after the liquidus is reached, but this is preferably avoided since it can promote solidification and build-up of the mixture on the vibrating member. It has been found that when the mixture is then cooled below the liquidus temperature of the metal (but above the metal's solidus temperature), it has an at least substantially globular microstructure which beneficially allows the use of semisolid casting: the mixture can be situated in a mold and formed into a desired shape while it is partially solidified (preferably while it has a solid fraction between 40%-70%), and it maintains a stable, nonturbulent flow front even when urged into the mold cavity at high velocity. Usefully, an at least substantially globular microstructure is maintained even where the mixture is quenched after solidification begins (i.e., where the mixture is rapidly cooled by immersion of the formed item and/or its die in a liquid bath, usually of water, oil, or molten salts). This result is surprising since ordinarily the temperature gradients arising from quenching promote a dendritic (non-globular) microstructure, thereby causing casting difficulties and/or nonuniformity in the strength and other properties of the casting.

The use of vibrational agitation is believed to assist with dispersion of nanoparticles throughout the (molten) metal matrix, and also with generation of a globular microstructure by fragmenting any forming dendrites. The nanoparticles, as well as any dendrite fragments, then serve as dispersed nucleation points during solidification, thereby helping to create and maintain the globular microstructure. Machine parts or other articles formed by use of the process have improved properties owing to the presence of the nanoparticles, and at the same time the advantages and efficiencies of semisolid casting are realized. Additionally, the ability to quench the cast article to room temperature once solidification begins saves significant time and energy over competing semisolid casting processes, wherein slower or temperature-controlled cooling may be needed.

Further advantages, features, and objects of the invention will be apparent from the following detailed description of the invention in conjunction with the associated drawings.

BRIEF DESCRIPTION OF THE DRAWINGS

FIGS. 1-5 schematically depict exemplary preferred steps that may be used to form metal matrix nanocomposites, wherein:

FIG. 1 depicts heating of an alloy 100 to a liquid state;

FIG. 2 depicts addition of nanoparticles 106 to the alloy 100;

FIG. 3 depicts ultrasonic agitation of the mixture 100 of the alloy and nanoparticles;

FIG. 4 depicts cessation of agitation and cooling of the mixture 100 toward a semisolid state; and FIG. 5 depicts casting of the semisolid mixture 100.

DETAILED DESCRIPTION OF PREFERRED VERSIONS OF THE INVENTION

To expand on the discussion above, following is a more detailed explanation of an exemplary method for forming a metal matrix nanocomposite, with reference being made to the accompanying drawings.

First, referring to FIG. 1, a metal 100 is brought to a temperature above its liquidus (preferably at least 50 C above). This can be done in any conventional manner, e.g., in a graphite crucible 102 using an electric resistance furnace. If desired, a cover gas 104 may be used to reduce oxidation of the molten metal 100.

As depicted in FIG. 2, nanoparticles 106 may then be added to the molten metal 100, preferably by simply applying them atop the surface of the metal 100. To promote faster mixing of the metal 100 and nanoparticles 106 during subsequent steps (discussed below), it may be useful to interrupt/pull back any oxide layer situated atop the molten metal 100 so that dispersion of the nanoparticles 106 is not hindered by the oxide layer. The nanoparticles 106 may additionally or alternatively be added by other means, as by introducing them with a carrier gas that bubbles up through the molten metal 100.

An ultrasonic probe or other vibrating member 108 can then contact the molten metal 100 (and preferably slightly penetrate, e.g., to a depth of perhaps 1 cm), as depicted in FIG. 3. Preferably, the member 108 is left off until contact or penetration occurs, and is turned on thereafter. Multiple vibrating members 108 can be used if desired, which may be useful if the volume of the melt 100 is significant, in which case the members 108 might be spaced about the melt 100 to promote more effective input of ultrasonic energy (and more rapid dispersion of the nanoparticles therein, with the nanoparticles not being denoted by a reference numeral in FIG. 3 owing to their dispersion within the melt 100). In similar respects, if the melt 100 has significant depth, more rapid dispersion of the nanoparticles may be promoted by deeper insertion of the member 108. Dispersion is also promoted by stirring of the melt 100, and such stirring can be done by the vibrating member 108 or by some non-vibrating member, e.g., a metal rod.

The ultrasound is preferably applied at least until nanoparticles no longer visibly float on the surface of the melt 100, and preferably for a short while thereafter. In tests, sonication was performed for 10-20 minutes after the nanoparticles were no longer visible, and subsequent analysis of resulting cast articles revealed that this was sufficient to result in substantially uniform dispersion of the nanoparticles.

Once it is believed that dispersion is sufficient, vibration may be stopped, the vibrating member(s) 108 may be removed from the mixture 100, and the heat supply to the mixture 100 may then be discontinued (as shown in FIG. 4). In the absence of heat, the temperature of the mixture 100 will fairly rapidly drop until it reaches its liquidus temperature (after which solidification begins, with the temperature dropping more slowly thereafter until the solidus is reached). The vibrating member(s) 108 may be removed before or after the mixture 100 is cooled, but are preferably removed before the liquidus is reached to help reduce solidification of the mixture 100 on the vibrating member(s) 108.

Once solidification begins—and preferably after it is 40%-70% complete, such that the mixture 100 can be readily handled as a solid mass (or more accurately, as a fluid but highly viscous mass)—it may be fit into the cavity of a mold, preferably under high pressure, so as to form a cast item having the shape of the mold cavity. An exemplary forming process is illustrated in FIG. 5, wherein the mixture 100 is fit into a sleeve 110 and a piston 112 urges the mixture into the cavity 114 of a mold/die 116. The mold/die 116 may then be quenched or otherwise artificially cooled (if desired), and/or after sufficient solidification occurs, the formed mixture 100 may be removed from the mold/die 116 for further cooling.

The foregoing process has been used to form metal matrix nanocomposite items using a variety of metals and nanocomposites, including aluminum alloy (A356) with silicon carbide (SiC) nanoparticles; A356 with aluminum oxide (Al2O3) nanoparticles; A356 with titanium oxide (TiO2) nanoparticles; A356 with carbon nanoparticles (nanotubes); magnesium alloy (AZ91D) with SiC nanoparticles; and zinc alloy (Zamak 2) with SiC and Al2O3 nanoparticles. However, it is expected that a wide variety of other metals and/or nanoparticles may alternatively or additionally be used, with other potential matrices including alloys of copper, iron, tin, lead, titanium, and nickel, and other potential nanoparticles including other oxides (e.g., such as silica, zirconia, cobalt oxide, nickel oxide, tungsten oxide, and yttrium oxide); nitrides (e.g., titanium nitride, silicon nitride, boron nitride, and aluminum nitride), carbides (e.g., chromium carbide and boron carbide); and carbon in other forms such as nanofiber carbon, graphite, amorphous carbon, and hard non-crystalline (diamond-like) carbon. It should be understood that this is merely an illustrative list of potential matrices and nanoparticles, and others are possible.

It is also possible that the invention may utilize "premixed" metals and nanoparticles which are melted after being mixed, subsequently cooled below the liquidus to a semisolid state, and then formed into a desired shape. Premixed metals and nanoparticles can be formed, for example, by ball milling of metals and desired additives until the metals and additives are ground sufficiently fine, and are sufficiently mixed, that the additives effectively provide dispersed nanoparticles after melting. The melt may then optionally be vibrated to assist in enhancing and/or maintaining nanoparticle dispersion, or if any additional nanoparticles are added after melting, such vibration may assist in their dispersion.

Note that the steps, materials, and components of the invention described above are merely exemplary, and in practice, these may be altered. Thus, it should be understood that the invention is not intended to be limited to the preferred versions described above, but rather is intended to be limited only by the claims set out below. The invention therefore encompasses all different versions that fall literally or equivalently within the scope of these claims.

What is claimed is:

1. A method of forming a metal matrix nanocomposite comprising the steps of:
    a. heating a metal above its liquidus temperature, thereby placing the metal in a liquid state;
    b. adding nanoparticles to the metal;
    c. vibrating the metal and nanoparticles;
    d. ceasing vibration while the metal is above its liquidus temperature; and
    e. forming the metal and nanoparticles into a desired shape by use of semi-solid casting when the metal is below its liquidus temperature but above its solidus temperature, wherein:
    (1) the metal lacks any grain refiners therein, and
    (2) the metal and nanoparticles, while below the metal's liquidus temperature, are not subjected to vibration, shearing, or other disruption apart from being formed into the desired shape.

2. The method of claim 1 wherein the vibration is at or above 5 kHz.

3. The method of claim 1 wherein the vibration is at or above 20 kHz.

4. The method of claim 1 wherein the metal and nanoparticles are vibrated by insertion of a vibrating member within the metal and nanoparticles.

5. The method of claim 1 further comprising the step of quenching the shaped metal and nanoparticles.

6. The method of claim 1 wherein the metal, when being shaped, has a solid fraction between 40%-70%.

7. The method of claim 1 wherein the metal includes at least one of:
    a. aluminum,
    b. zinc,
    c. magnesium,
    d. copper,
    e. iron,
    f. tin,
    g. titanium, and
    h. nickel.

8. The method of claim 1 wherein the nanoparticles are formed of at least one of:
    a. silicon carbide,
    b. silicon nitride,
    c. aluminum oxide,
    d. titanium nitride,
    e. titanium oxide,
    f. zirconium oxide,
    g. yttrium oxide,
    h. cerium oxide, and
    i. carbon.

9. The method of claim 1 wherein the nanoparticles form 0.25%-2.0% of the weight of the formed shape.

10. The method of claim 1 wherein the metal is not mechanically sheared between the step of adding nanoparticles to the metal and the step of forming the metal and nanoparticles into a desired shape.

11. A method of forming a metal matrix nanocomposite comprising the steps of:
    a. providing a mixture of nanoparticles and metal wherein the nanoparticles provide 0.25%-5.0% of the weight of the mixture, wherein the metal is above its liquidus temperature;
    b. vibrating the mixture when the metal is above its liquidus temperature;
    c. ceasing vibration before the metal drops below its liquidus temperature;
    d. flowing the mixture into a mold when the metal is below its liquidus temperature but above its solidus temperature, with the metal having between 40%-70% solid fraction, thereby molding the mixture into a desired shape via semi-solid casting,
    wherein:
    (1) the mixture does not contain grain refiners therein, and
    (2) the metal and nanoparticles, when the metal is below its liquidus temperature, are not subjected to vibration, shearing, or other disruption apart from being molded into the desired shape.

12. The method of claim 11 wherein the vibration is at or above 5 kHz.

13. The method of claim 11 wherein the vibration is at or above 20 kHz.

14. The method of claim 11 wherein the mixture is vibrated by inserting a vibrating member within the mixture.

15. The method of claim 11 further comprising the step of quenching the mixture after flowing the mixture into the mold.

16. The method of claim 11 wherein the metal includes at least one of:
 a. aluminum,
 b. zinc,
 c. magnesium,
 d. copper,
 e. iron,
 f. tin,
 g. titanium, and
 h. nickel.

17. The method of claim 16 wherein the nanoparticles are formed of at least one of:
 a. silicon carbide,
 b. silicon nitride,
 c. aluminum oxide,
 d. titanium nitride,
 e. titanium oxide,
 f. zirconium oxide,
 g. yttrium oxide,
 h. cerium oxide, and
 i. carbon.

18. The method of claim 11 wherein the mixture is not mechanically sheared prior to flowing the mixture into a mold.

19. A method of forming a metal matrix nanocomposite comprising the steps of:
 a. adding nanoparticles to a metal while the metal is above its liquidus temperature;
 b. applying ultrasonic energy to the metal and nanoparticles while the metal is above its liquidus temperature;
 c. maintaining application of ultrasonic energy to the metal and nanoparticles until the metal is at or near its liquidus temperature;
 d. ceasing application of ultrasonic energy to the metal and nanoparticles before the metal drops below its liquidus temperature; and
 e. situating the metal and nanoparticles within a mold while the metal is below its liquidus temperature and above its solidus temperature, thereby molding the mixture into a desired shape via semi-solid casting,
 wherein the metal and nanoparticles, while below the metal's liquidus temperature:
  (1) do not contain grain refiners, and
  (2) are not subjected to vibration, shearing, or other disruption apart from being molded into the desired shape.

20. The method of claim 19 wherein ultrasonic energy is applied to the metal and nanoparticles by insertion of a vibrating member within the metal and nanoparticles.

21. The method of claim 20 wherein the vibrating member is removed from the metal and nanoparticles while the metal is at or above its liquidus temperature.

22. The method of claim 19 further comprising the step of quenching the shaped metal and nanoparticles while the metal is below its liquidus temperature.

23. The method of claim 19 wherein the nanoparticles are added to the metal to form a mixture wherein the nanoparticles provide 0.25%-2.0% of the weight of the mixture.

24. The method of claim 19 wherein:
 a. the metal includes at least one of:
  (1) aluminum,
  (2) zinc,
  (3) magnesium,
  (4) copper,
  (5) iron,
  (6) tin,
  (7) titanium, and
  (8) nickel; and
 b. the nanoparticles are formed of at least one of:
  (1) silicon carbide,
  (2) silicon nitride,
  (3) aluminum oxide,
  (4) titanium nitride,
  (5) titanium oxide,
  (6) zirconium oxide,
  (7) yttrium oxide,
  (8) cerium oxide, and
  (9) carbon.

25. The method of claim 19 wherein the metal is not mechanically sheared between the step of adding nanoparticles to the metal and the step of situating the metal and nanoparticles within a mold.

* * * * *